United States Patent [19]

Tino

[11] Patent Number: 5,280,622
[45] Date of Patent: Jan. 18, 1994

[54] COMBINED LIGHT BEAM AND ULTRASONIC TRANSDUCER SAFETY SENSING SYSTEM

[75] Inventor: Christopher J. Tino, Durham, N.C.

[73] Assignee: Mitsubishi Semiconductor America, Inc., Durham, N.C.

[21] Appl. No.: 914,341

[22] Filed: Jul. 17, 1992

[51] Int. Cl.$^5$ ............................................. G06F 9/00
[52] U.S. Cl. ...................................... 395/90; 395/94; 364/461
[58] Field of Search ........................... 395/90, 93, 94; 364/460, 461

[56] References Cited

U.S. PATENT DOCUMENTS

| | | | |
|---|---|---|---|
| 4,620,285 | 10/1986 | Perdue | 395/94 |
| 4,679,152 | 7/1987 | Perdue | 364/513 |
| 4,718,023 | 1/1988 | Arora | 395/94 |
| 4,857,912 | 8/1989 | Everett, Jr. et al. | 340/825.3 |
| 4,903,009 | 2/1990 | D'Ambrosia et al. | 340/556 |
| 4,910,464 | 3/1990 | Trett et al. | 328/5 |
| 4,920,520 | 4/1990 | Gobel | 395/94 |
| 5,015,840 | 5/1991 | Blau | 250/221 |
| 5,023,597 | 6/1991 | Salisbury | 340/572 |

OTHER PUBLICATIONS

"Polaroid Ultrasonic Ranging System Handbook Application Notes/Technical Papers", Experimental Demonstration Board, to Shirley Y. Tam.
"Superlight V", Triad Controls, Inc., America's Machine Guarding/Machine Control Company.
"Ultrasonic Ranging System", Polaroid Ultrasonic Ranging Unit.

*Primary Examiner*—Allen R. MacDonald
*Attorney, Agent, or Firm*—Lowe, Price, LeBlanc & Becker

[57] ABSTRACT

A safety interlock system for a robotic apparatus includes a light curtain in combination with ultrasonic sensors to perform a staged interlock to reduce unnecessary alarms or shutdowns. A robotic apparatus, such as a linear travel-type robot system, is protected by a fixed light curtain for detecting intrusion of a foreign object into a work space of the robotic apparatus. Ultrasonic transducers provide signals indicating a distance to an object interrupting the light beams forming the light curtain. An X-axis position of the robotic apparatus is compared with an object distance to determine whether to slow or stop robotic motion. Four stages of response to light beam interruption are provided. If there is no input from the ultrasonic transducer, an interruption of a light beam causes an immediate and complete halting of robotic movement to provide fail-safe operation. If the ultrasonic transducer indicates that the robotic apparatus and object are separated by a safe nominal operating distance, e.g., greater than six feet, an audible alarm is activated but robot maneuvering is not inhibited. If separation is within a warning range of, for example, three to six feet, robot movement speed is reduced and the alarm is activated. Finally, if separation is determined to be less than the minimum value of the warning range, i.e., less than three feet, the robot is fully stopped and the alarm is activated.

22 Claims, 8 Drawing Sheets

5,280,622

COMBINED LIGHT BEAM AND ULTRASONIC TRANSDUCER SAFETY SENSING SYSTEM

TECHNICAL FIELD

The invention relates to an interlock system for avoiding collision between a maneuverable apparatus and a foreign object and, more particularly to a staged interlock system for progressively inhibiting movement of a robotic system by detecting a range to a foreign object creating a collison hazard.

BACKGROUND ART

Many tasks previously performed by humans are now accomplished by robotic machines controlled by a stored program of instructions. These tasks include repetitive operations adaptable to machine implementation, operations in hazardous areas or involving handling of hazardous articles, processes accomplished in environments not conducive to human workers and operations requiring precision maneuvering and positioning of work objects. For example, in the semiconductor fabrication field, robots are used in a clean room environment to transport, handle and process semiconductor components including silicon wafers, chips and packaged integrated circuits. Each robotic device interacts with other robotic devices and with human workers stationed in the work space to supervise, control and perform other adjunct processes.

Associated safety systems are used to detect collison hazards and control robot operations accordingly. Collision hazards may be caused by intrusion of a foreign object such as a human, another robotic device, or some other material into a work envelope or work area of the robotic device. Current state of the art multiple beam infrared detection systems, commonly known as "light curtains", are used to prevent robotic systems from coming into contact with obstacles that enter the work envelope. An example is a human entering the work envelope of the X axis of a linear travel-type robot system.

As shown in FIG. 1, a multiple beam infrared detection system includes an infrared transmitter unit 22 including an infrared emitter module 24. Emitter module 24 includes a plurality of vertically aligned infrared light emitting diodes for emitting a plurality of parallel infrared light beams 26 forming a "light curtain" 28 between transmitter assembly 22 and opposing infrared receiver assembly 30. Light curtain 28 defines a vertically oriented planar area along one side or wall of the work envelope. The infrared light beams are received by infrared receiver unit 30 which includes an infrared detector assembly 32 for detecting infrared light beams 26. Assembly 30 comprises a plurality of vertically aligned infrared detectors such as phototransistors or photodiodes for receiving and detecting respective light beams 26. Associated control electronics process signals from detector assembly 32 to supply a logic signal. The logic signal provides an indication of an interruption of any of the light beams 26 forming curtain 28.

A machine such as a linear travel-type robot system 40 is located behind light curtain 28 within the work envelope. Robot 40 is maneuverable along the X axis on platform 42 in response to control signals supplied by a robot controller. The light curtain is used to prevent the robotic system from maneuvering into contact with obstacles that enter the work envelope by inhibiting robot motion upon detection of an object penetrating the light curtain. When interrupted, the light curtain system actives a complete safety stop of the X axis motion of the robot to avoid a collison with the obstacle. A light curtain system similar to that described is disclosed in Blau, U.S. Pat. No. 5,015,840, incorporated herein by reference and is commercially available from manufacturers including Triad Controls, Inc. of Pittsburgh, Pa., and Scientific Technologies Inc. of Hayward, Calif.

In another configuration, a multi-sided guarding system includes a plurality of mirrors for reflecting infrared light beams to enclose a work envelope. A wrap-around light curtain is also used to provide a multi-sided guard for moving equipment, robots or machinery to prevent injury to personnel and to prevent damage to equipment when maneuvered in the presence of a foreign object in the work envelope. Referring to FIG. 2, infrared transmitter assembly 22 emits a plurality of vertically spaced parallel light beams 26 using an array of light emitting diodes to form a light curtain 28. Corner mirrors 34 reflect the light beams to infrared receiver unit 30 positioned immediately adjacent infrared transmitter unit 22 to enclose the work envelope within the light curtain. A machine such as a pick-and-place robot 44 is located within the work space and is responsive to a stored program for performing nominal maneuvering operations and to interruption of the light beams to halt all movements. Penetration of the light curtain halts robotic motion to prevent injury to personnel and avoid damage to the robotic apparatus by a foreign object.

As described, detection of a foreign object penetrating a light curtain completely inhibits or disables motion of a robotic device to avoid injury to personnel and damage to the device. However, light curtain systems operate to disable robotic operations regardless of the distance between the obstacle and the position of the robot. If a light beam forming the curtain is broken, a full electromechanical stop of the robotic device is initiated. This can result in over-protection of the robot operating envelope. For example, in the long length linear motion system shown in FIG. 1, the obstacle may actually not pose any hazard to operation, particularly if the distance between the current position of the robot and the obstacle is beyond the true requirements for safe operation. Similarly, in the wrap-around system depicted in FIG. 2, pick-and-place robot 44 may be positioned and maneuvering in a portion of the work envelope which would not create a hazard to personnel entering a far side of the envelope.

Accordingly, a need exists for a safety interlock system for detecting entry of a foreign object into a work envelope and selectively inhibiting mechanical operations of a machine in response to proximity of the object to the machine.

A need further exists for a safety interlock system for progressively inhibiting mechanical operations of a machine in response to a decreasing distance between the machine and a detected obstacle.

A need further exists for selectively decreasing a maneuvering speed of a robotic device in response to detection of an obstacle approaching the robotic device.

A need further exists for a safety interlock system including a fail-safe operation which inhibits operations of a mechanical device located in a work envelope upon detection of a foreign obstacle entering the work envelope when a distance between the machine and foreign object cannot be determined.

A need further exists for a method of maneuvering an apparatus within a work envelope which is responsive to penetration of a foreign object into the work envelope and a distance between the apparatus and the foreign object.

DISCLOSURE OF THE INVENTION

According to one aspect of the invention, a safety interlock system for detecting an obstruction or foreign object within a work envelope or work space includes a light curtain for detecting penetration of the foreign object through a planar area defining one side of the work space and, in response, supplying a penetration detection signal. An ultrasonic sensor detects a distance between the foreign object and a machine located in the work envelope and, in response, supplies a distance signal. A control circuit supplies a motion control signal to the machine for selectively inhibiting movement thereof in response to the penetration detection signal and the distance signal. The light curtain may include a plurality of light emitters spaced along one edge of the planar area for transmitting parallel beams of light along the planar area. A plurality of sensors are spaced along an opposite edge of the planar area for sensing respective ones of the parallel beams, with a detector circuit detecting an interruption of the parallel beams of light received by the detectors.

According to a feature of the invention, the ultrasonic sensor includes an ultrasonic transmitter responsive to a drive signal for transmitting ultrasonic energy in a direction substantially parallel to the planar area. An ultrasonic receiver receives a reflected ultrasonic signal to supply an echo signal. A ranging circuit is responsive to a time between the drive signal and the echo signal for supplying the distance signal.

According to another feature of the invention, the ultrasonic sensor includes a plurality of ultrasonic transducers vertically spaced along one edge of the planar area for transmitting and receiving an ultrasonic signal in a substantially horizontal direction along the planar area. A ranging circuit is responsive to a time between transmission of the ultrasonic signal and receipt of a reflected ultrasonic signal to supply the distance signal.

According to another aspect of the invention, the machine is responsive to the motion control signal to function in three modes of operation including (i) a normal mode, (ii) a reduced operating speed mode, and (iii) a pause or motion inhibited mode wherein movement of the machine is substantially halted. The corresponding control means includes a target detector responsive to the distance signal from the ultrasonic sensor to supply a target detect signal when the ultrasonic detector detects the foreign object. A comparator circuit is responsive to the distance signal for categorizing the distance between the foreign object and the machine within one of three range categories including greater than, less than, or within a predetermined warning range of distances. The outcome of this determination is supplied as a trinary state range signal. A logic circuit is responsive to the target detect signal, the trinary state range signal and to the penetration detection signal to supply the motion control signal to the machine.

The logic circuit selectively supplies the motion control signal to reduce an operating, positioning and/or maneuvering speed of the machine when the foreign object penetrates the light curtain and is detected within the predetermined range of distances from the protected object. Motion of the machine is halted when the foreign object penetrates the light curtain and is either not detected by the target detector or is detected closer to the machine than the predetermined range of distances.

According to another aspect of the invention, a robotic controller supplies a robotic maneuvering control for maneuvering the machine in response to a stored program. A robotic speed controller is responsive to the motion control signal and to the robotic maneuvering control signal for controlling a maneuvering speed of the machine. Movement of the machine is halted in response to the motion control signal.

According to another aspect of the invention, a robotic control system provides a motion control signal to a robotic apparatus maneuverable within a work space or envelope. A first sensor detects penetration of a foreign object through a planar area defining one side of the work envelope and, in response, supplies a penetration detection signal. A second sensor detects a distance between the foreign object and the robotic apparatus to supply a distance signal. A controller supplies a motion inhibit signal in response to the penetration detection signal and the distance signal. A processor executes instructions stored in a memory and, in response to the motion inhibit signal, supplies the motion control signal to the robotic apparatus whereby a maneuvering speed of the robotic apparatus is selectively reduced in response to detection of the foreign object within the work envelope posing a collision hazard to the robotic apparatus.

According to another feature of the invention, the first sensor comprises a light curtain including plural light emitters spaced along one edge of the planar area for transmitting parallel beams of light along the planar area. Optical detectors, spaced along an edge of the planar area, detect the beams of light. In response to interruption of the beams of light, the penetration detection signal is supplied.

According to another feature of the invention, the second sensor comprises an ultrasonic sensor including an ultrasonic transmitter responsive to a drive signal for transmitting ultrasonic energy in a direction parallel to the planar area. An ultrasonic receiver receives a reflected ultrasonic signal to supply an echo signal. A ranging circuit measures a time between the drive signal and the echo signal to compute the distance signal.

According to another feature of the invention, the second sensor includes a plurality of ultrasonic transducers vertically spaced along one edge of the planar area for transmitting and receiving an ultrasonic signal in a substantially horizontal direction along the planar area. A ranging circuit is responsive to a time between transmission of the ultrasonic signal and receipt of a reflected ultrasonic echo signal to supply the distance signal.

According to another aspect of the invention, a method of inhibiting operation of a machine upon detection of intrusion of a foreign object within a safety region includes steps of transmitting a detection signal along one side of the safety region to define a planar detection area. An interruption of the detection signal caused by penetration of the planar detection area by a foreign object is detected. A ranging signal is also transmitted along the planar area, the ranging signal as reflected by the foreign object being received as an echo signal. A period of time between the transmission and reception of the ranging signal is measured to calculate a distance between the foreign object and the machine.

An operating speed of the machine is controlled in response to detecting penetration of the planar detection area and a distance between the foreign object and the machine.

According to a feature of the invention, the step of transmitting a detection signal includes the step of emitting, from one edge of the planar detection area, plural parallel light beams along one side of the safety region to an opposite edge of the planar detection area. The step of detecting an interruption of the detection signal includes a step of detecting an intensity of the light beams at the opposite edge of the planar detection area, reduction of the intensity to a predetermined threshold being detected as an interruption of a light beam.

According to another feature of the invention, the step of transmitting a ranging signal includes the step of emitting an ultrasonic signal, and the step of receiving the ranging signal includes the step of receiving an ultrasonic echo signal.

According to another feature of the invention, the control step includes selectively operating the machine at a nominal or reduced maneuvering speed or halting the machine. The machine is operated at the nominal maneuvering speed with no object detected penetrating the planar detection area or when the distance to the foreign object is calculated to be greater than a predetermined range of distances. A reduced maneuvering speed is used when the distance to the foreign object is calculated to be within the predetermined range of distances. Maneuvering operations of the machine are halted when the foreign object is detected to penetrate the planar detection area and the distance to the foreign object is either indeterminable, i.e., an invalid value, or is calculated to be less than the predetermined range of distances.

According to a feature of the invention, the step of controlling the operating speed of the machine includes steps of verifying reception of a valid ranging signal by the receiving step and determining whether the distance between a foreign object and the moveable object is greater than, less than, or within the predetermined warning range of distances. The operating speed of the machine is controlled in response to the steps of detecting a foreign object penetrating the planar detection area, verifying reception of the ranging signal and to the distance determined according to the determining step.

According to another aspect of the invention, a method of maneuvering a robotic apparatus within a work space or work envelope includes the steps of detecting penetration of a foreign object through a planar area defining one side of the work envelope. A distance between the foreign object and the robotic apparatus is calculated and, in response, the robotic apparatus is maneuvered within the work envelope so that a maneuvering speed of the robotic apparatus is selectively reduced in response to detection of the foreign object within the work envelope posing a collison hazard.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 9 is a perspective view of a linear travel-type robot system including a safety interlock system according to a third embodiment of the invention.

BEST MODE FOR CARRYING OUT THE INVENTION

Figure 1:
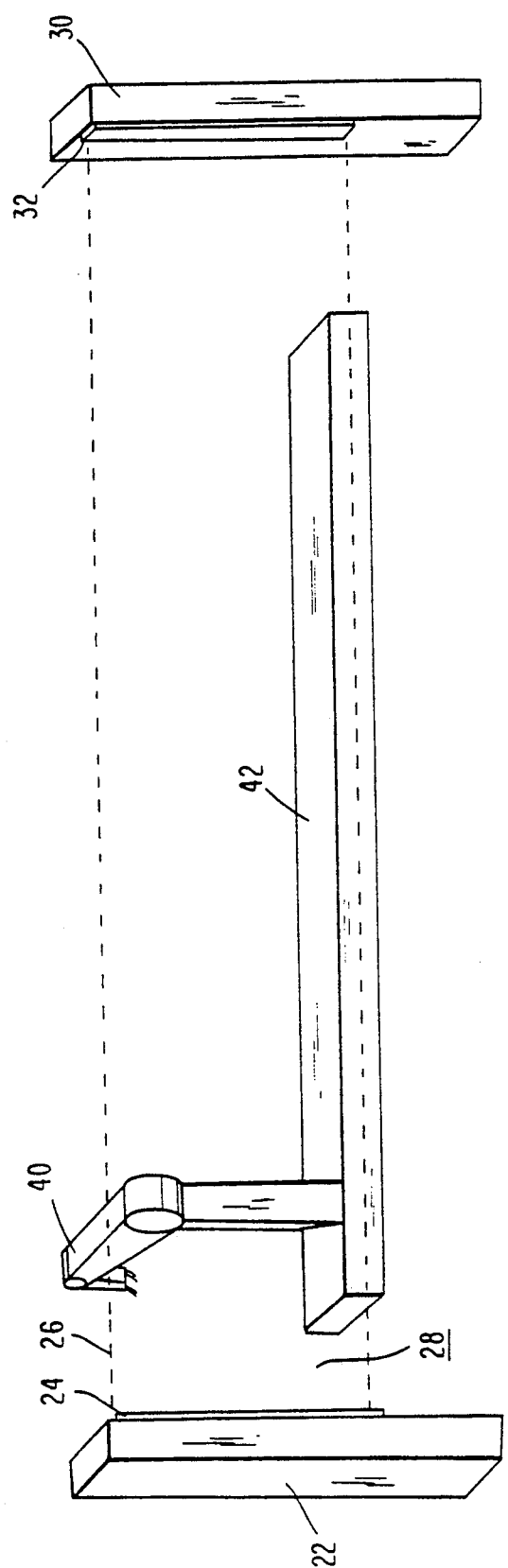
FIG. 1 is a perspective view of a linear travel-type robot system positionable along an X-direction of travel behind a light curtain.
Figure 2:
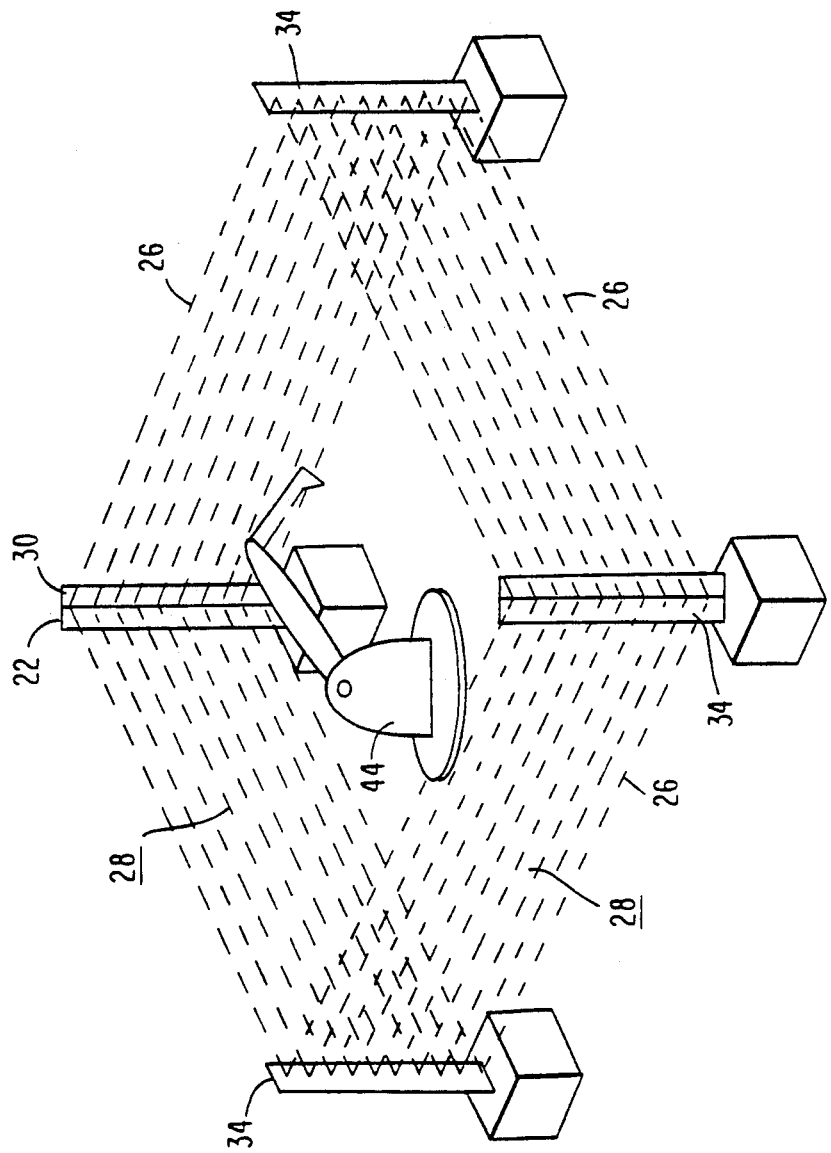
FIG. 2 is a perspective view of a pick-and-place robot positioned within a protected work envelope surrounded by a wrap-around light curtain.
Figure 3:
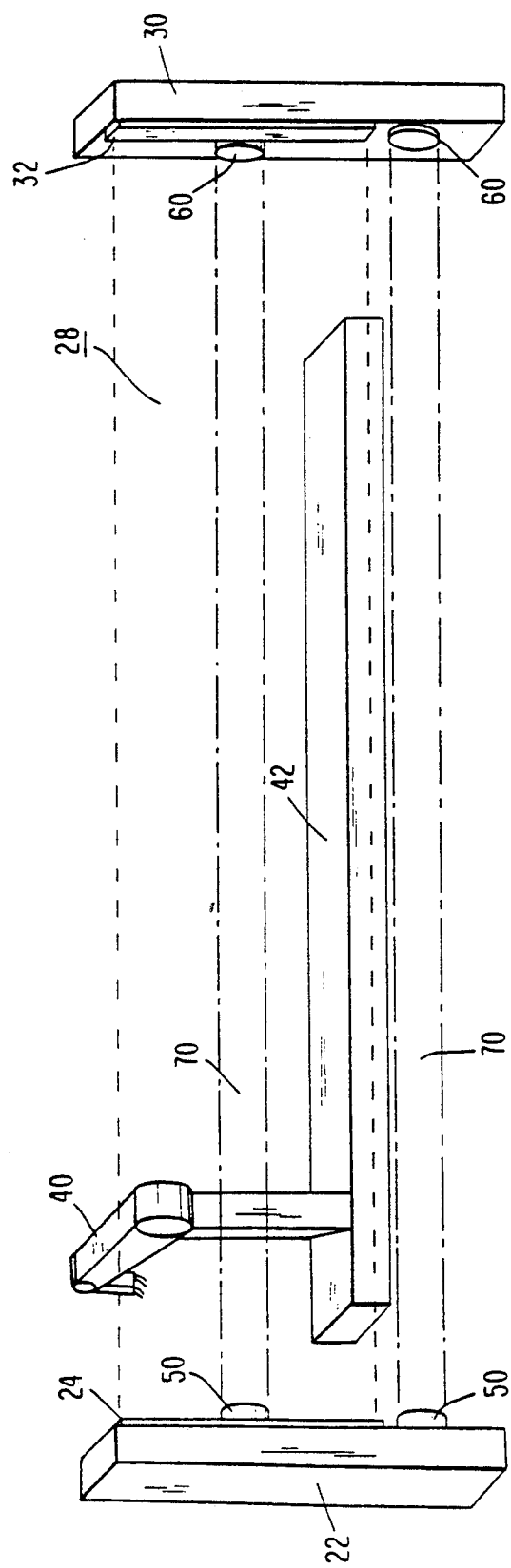
FIG. 3 is a perspective view of a linear travel-type robot system positioned behind a safety interlock system according to a first embodiment of the invention.

The invention incorporates a light curtain in combination with ultrasonic sensors to carry out a staged interlock to reduce alarms or shutdowns of a machine or robotic device upon detection of an obstruction or foreign object in a protected work envelope or work space. Referring to FIG. 3, a first embodiment of the invention is applicable to a linear travel-type robot system, protected by both a light curtain and ultrasonic transducers, the latter providing signals indicating a distance to an object interrupting a light curtain beam. The X axis position of robot 40 is compared with an object distance to determine whether to slow or stop robot motion.

There are four stages of response to light beam interruption. If there is no input from the ultrasonic transducer, the robot is fully stopped (fail-safe operation). If the ultrasonic transducer indicates that the robot and object are separated by greater than a predetermined distance, such as six feet, an audible alarm is activated. If separation is within a predetermined range, for example, between three and six feet, robot movement is reduced and an alarm is activated. Finally, if the separation is found by the ultrasonic transducer to be less than the minimum value within the range, i.e., less than three feet, the robot is fully stopped and the alarm is activated.

The safety interlock system includes a conventional light curtain device including infrared transmitter unit 22 and infrared receiver unit 30 establishing a light curtain 28 shown between the dashed lines of FIG. 3. The light curtain comprises a plurality of closely spaced, parallel light beams emitted in the X direction to infrared receiver 30 by a vertical array of infrared emitters of infrared emitter module 24. The light curtain detects penetration thereof along the Z axis indicating that an obstruction is located along the travel path of robot 40 along track or platform 42.

Ultrasonic transducers 50 are positioned on or proximate infrared transmitter unit 22 for measuring a distance in the X axis of a foreign object penetrating light curtain 28. Ultrasonic transducers 50 transmit an outgoing ultrasonic signal and also function as electrostatic microphones to receive reflected signals or "echoes" returned by ultrasonic reflector 60 positioned on or proximate infrared receiver unit 30 or by any foreign object positioned in the path of the ultrasonic wave signal. By measuring the round trip time of the ultrasonic signal, i.e., the time required to travel from the transducer to an object and return is measured to compute a radial distance from the transducer to the object. The ultrasonic signal can be focused to be concentrated along the X axis to maximize sensitivity along a plane of the light curtain and to reduce detection of extraneous echoes produced by off-axis objects such as known objects within the work envelope and objects and personnel well outside of the work envelope. Suitable transducers, control circuitry and distance ranging units are commercially available from the Polaroid Corporation, Ultrasonic Components Group in Cambridge, Mass.

Figure 4:
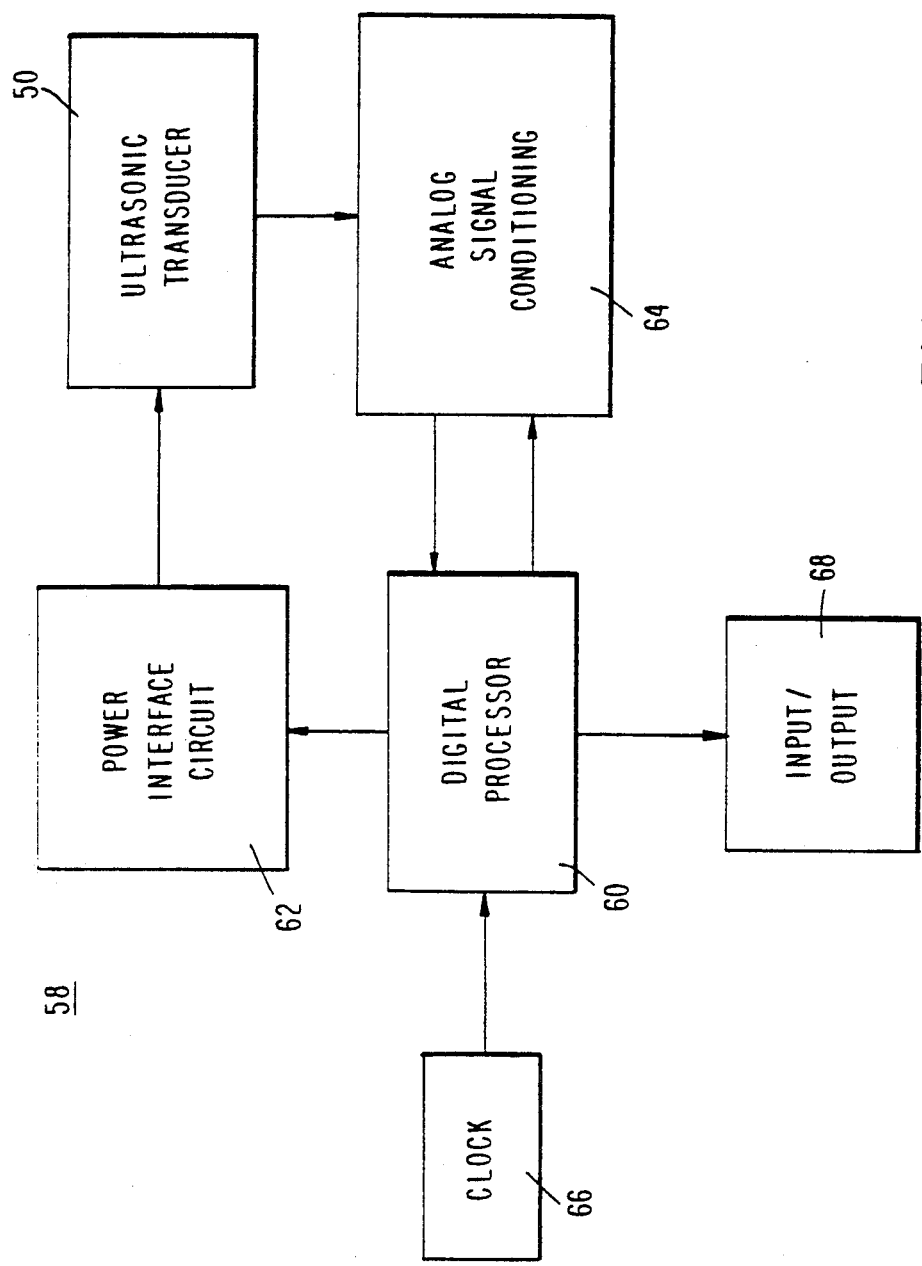
FIG. 4 is a block diagram of an ultrasonic range system.

A block diagram of an ultrasonic ranging system is shown in FIG. 4. The principal component of the system is the ultrasonic transducer 50 which acts as both loudspeaker and microphone. The transducer emits a burst of high frequency sound pulses called a "chip" lasting about one millisecond. The transducer is then operated in a receive mode to detect an echo returning from an object reflecting the sound pulses.

Digital processor 60 provides the high frequency pulses which are amplified to a level of several hundred volts by power interface circuit 62 and supplied to ultrasonic transducer 50. In response, ultrasonic transducer 50 emits 50 a chip signal. Digital processor 60 also supplies control signals to analog signal conditioning circuit 64 to control detector sensitivity, threshold, bandwidth and timing parameters. Clock circuit 66 supplies clock pulses for synchronous operation of digital processor 60.

Echo signals received by ultrasonic transducer 50 are sensed to provide a received signal to analog signal conditioning circuit 64. The received signal is amplified in response to a system gain signal supplied by digital processor 60 and detected. Detection of an echo by analog conditioning circuit 64 results in generation of an echo detect signal to digital processor 60. Digital processor 60 measures a time between transmission of the ultrasonic signal and reception of the returned echo signal by counting clock pulses generated by clock circuit 66 during the round trip period. Distance to the object reflecting the transmitted signal is computed based on the speed of sound through air.

Figure 5:
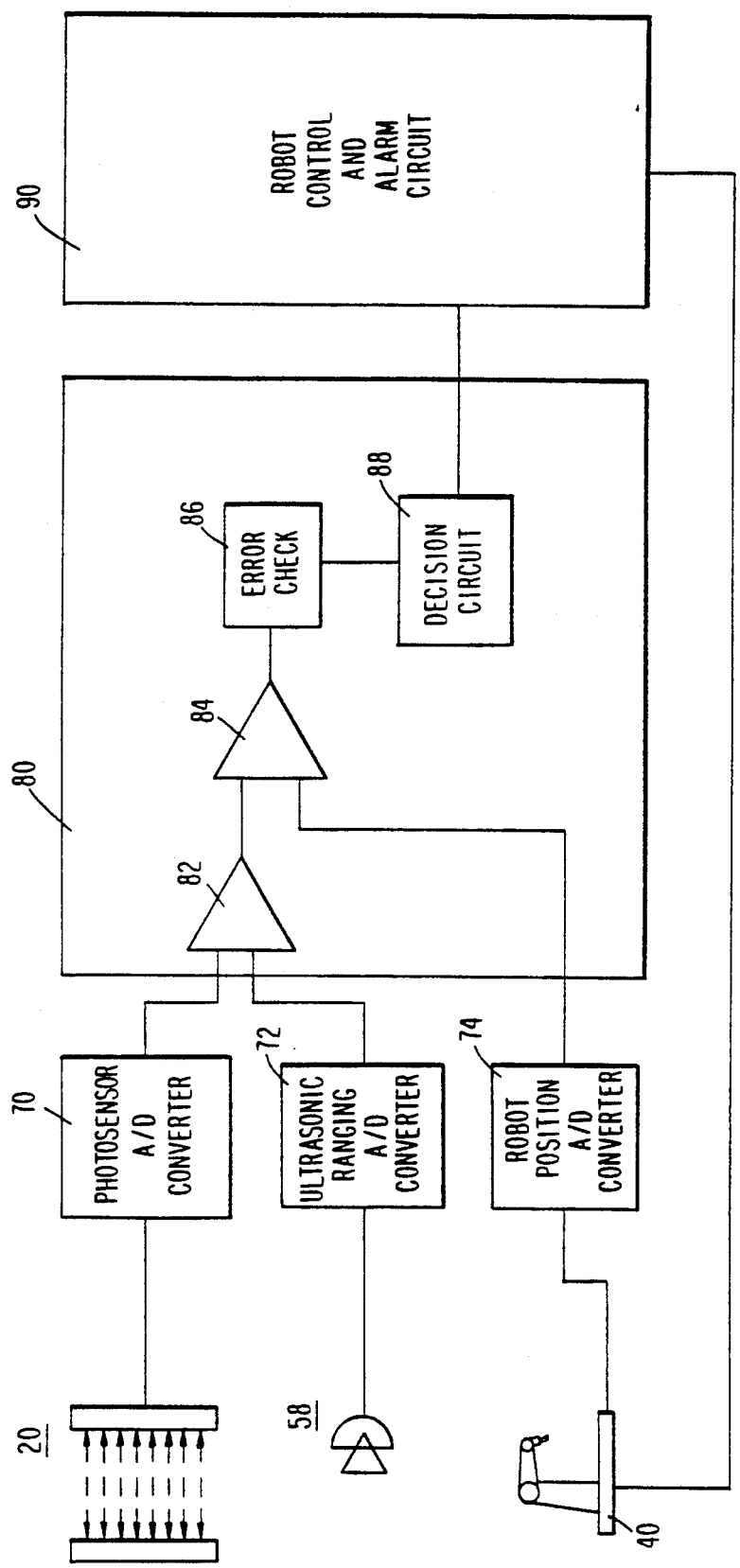
FIG. 5 is a functional block diagram of a robotic control and safety interlock system according to the invention.

A functional block diagram of the safety sensing system is presented in FIG. 5. An analog switching output from light curtain 20 is supplied to analog-to-digital (A/D) converter 70 which, in turn, provides a digital level signal to comparator 82 of processor 80. Although comparators 82 and 84 together with error check function 86 and decision circuit 88 are shown as hardware, these functions can be implemented in corresponding software or firmware. An analog output is also supplied from ultrasonic sensor 58 to ultrasonic ranging A/D converter 72, the digital output therefrom also being provided to comparator 82. Comparator 82 processes the digital signals to detect and supply a range to an obstruction penetrating the light curtain.

A position output from robot 40 is provided to a robot position A/D converter 74. The position of the robot is compared with the position of a detected foreign object by comparator 84 to determine a distance between the foreign object and robot. This data is supplied to error check circuit 86 which validates the distance data, checking to insure that the location of the foreign object is within a linear operating range of the robot. Decision circuit 88 receives the distance information together with a valid/invalid distance flag signal.

If the light curtain is penetrated and the distance signal is invalid, or if a valid distance is less than a predetermined minimum safe operating range (i.e., less than three feet), a halt signal is generated and supplied to Robot Control and Alarm Circuit 90 and an audible and/or visual alarm is generated. If a valid distance signal indicates a robot to foreign object distance falls within a predetermined range of warning values, i.e., three to six feet, the decision circuit 88 provides an instruction to Robot Control and Alarm Circuit 90 to reduce a maneuvering speed of robot 40 and to generate an alarm. Finally, if a validated distance between a foreign object and robot 40 is greater than a maximum value of the predetermined range, i.e., greater than six feet, then a signal instructing Robot Control and Alarm Circuit 90 to generate an alarm signal is supplied without inhibiting robot operations.

Robot Control and Alarm Circuit 90 is responsive to signals from decision circuit 88 for inhibiting nominal maneuvering of robot 40 under program control. The robot program comprises a sequence of instructions stored in a memory of circuit 90.

Figure 6:
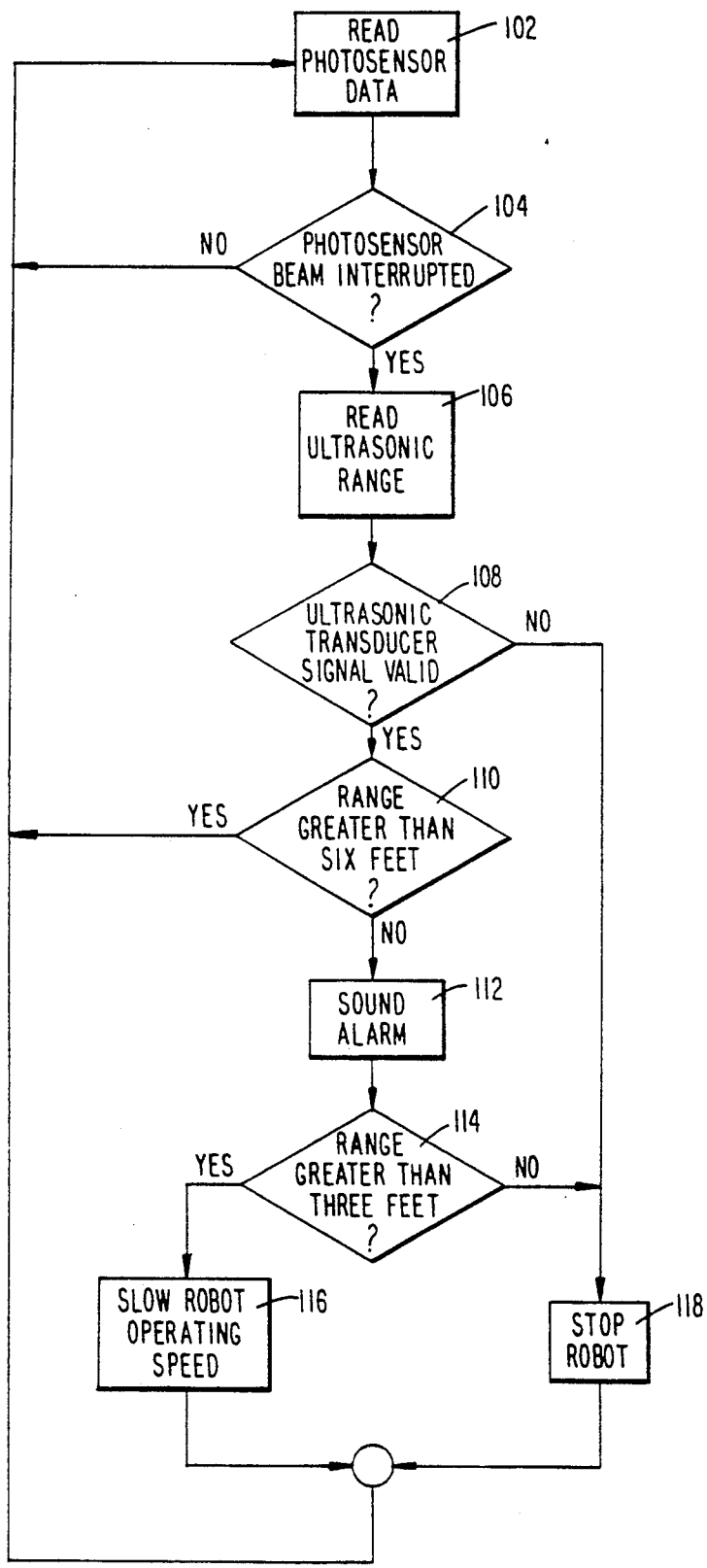
FIG. 6 is a logic flow diagram according to the method of the invention.

FIG. 6 is a logic flow diagram according to an embodiment of the invention. At step 102, photosensor data is read and supplied to the microprocessor. The photosensor data is checked at step 104 to determine if a photosensor beam has been interrupted. If the light curtain has not been penetrated then the process continues back to step 102 where new photosensor data is sampled. If a photosensor beam is interrupted, then ultrasonic range data is read at step 106. If desired, an alarm can also be sounded at step 106 to alert an operator that the light curtain has been penetrated.

A validity check of the ultrasonic transducer signal is performed at step 108 to determine if valid range information to the foreign object is available. For example, if the ultrasonic range data indicates a nominal maximum idle value of the system, i.e., that no object is detected other than the far ultrasonic reflectors 60 positioned along one edge of the light curtain, then processing continues to step 118 to halt robot operations.

If the ultrasonic transducer signal is valid, the range information is compared at step 110 with a minimum safe distance for operating the robot at a nominal maneuvering speed. In this example, if the foreign object is detected to be more than six feet from the robot, no action is taken and processing continues back to sample updated photosensor distance data. If, however, the foreign object is detected within six feet of the robot, an alarm is sounded at step 112. If the range from the robot to the foreign object is less than three feet, processing continues at step 118 to halt robot operations. If the distance between the robot and the foreign object is greater than three feet (but less than six feet), then a robot operating speed is reduced at step 116 and processing continues to read new photosensor data. Thus, motion of the robot is progressively inhibited in response to the proximity of an obstruction. If range information is not available, the system reverts to a fail-safe mode and inhibits all robotic maneuvering.

Figure 7:
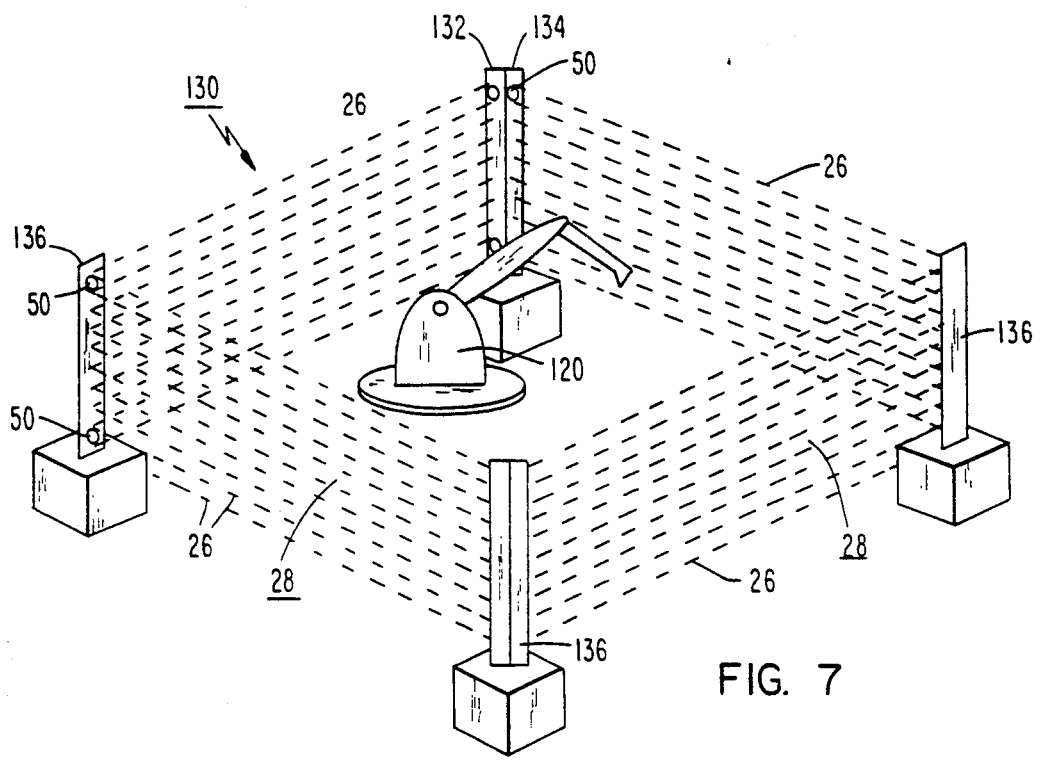
FIG. 7 is a perspective view of a robotic apparatus positioned within a work area circumscribed by a safety interlock system according to a second embodiment of the invention.

Another embodiment of the invention directed to detecting obstructions entering from multiple sides of a work envelope is shown in FIG. 7. A multi-sided safety sensing system includes a wrap-around light curtain 130 and collocated ultrasonic ranging sensors 50. Wrap-around light curtain 130 includes infrared transmitter unit 132 for emitting a plurality of parallel light beams 26 forming a light curtain 28. Cornering mirrors 136 reflect the light beams about a periphery of a centrally located work space in which a maneuverable machine, such as a pick-and-place robot 120, is operated. Infrared receiver 134 receives the reflected light beams 26 to detect penetration of light curtain 28 by sensing an obstruction of one or more of the light beams.

Figure 8:
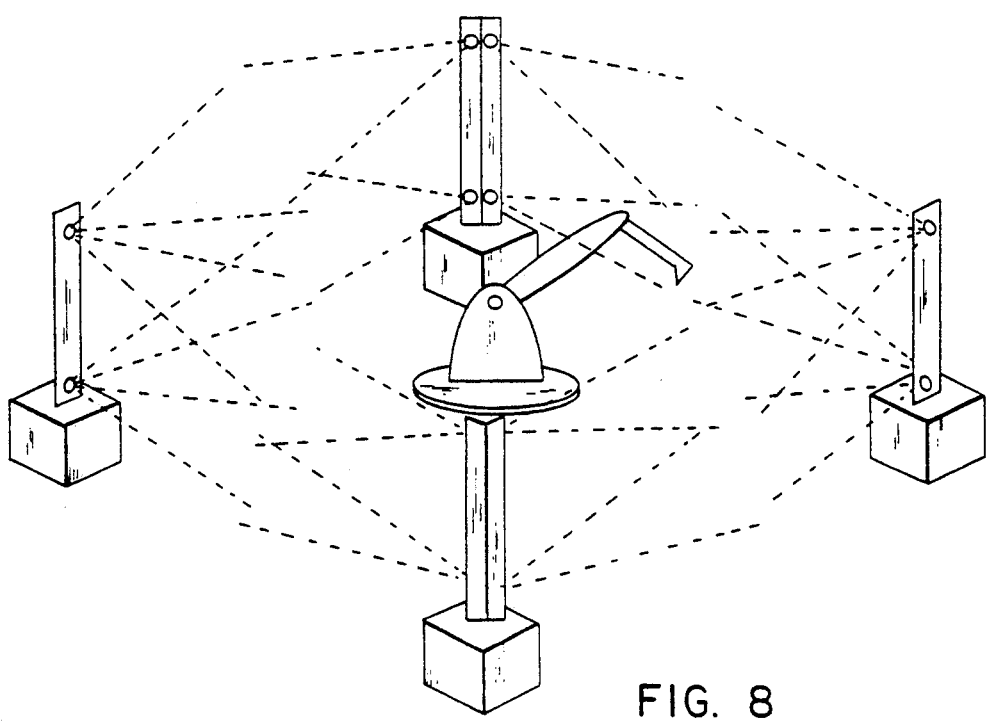

Ultrasonic transducers 50 radiate high frequency audio signals along a plane of the light curtain as shown in FIG. 8 to detect an obstruction and provide range information to the obstruction. In FIG. 8, the dashed lines represent the pattern of the ultrasonic signal transmitted from a transducer and reflected from an opposing reflector. Alternatively, opposing sets of ultrasonic transducers may be used to increase sensor range.

Maneuvering of robot 120 is inhibited upon detection of a foreign object penetrating a portion of the light curtain wherein a collision hazard is created. As previously described, the system uses a staged interlock method to progressively restrict robot movement in response to decreasing distance between the robot and the detected obstruction. The system maintains fail-safe operation to comply with applicable work place safety standards by fully inhibiting robot motion if valid distance information is not available.

Figure 9:
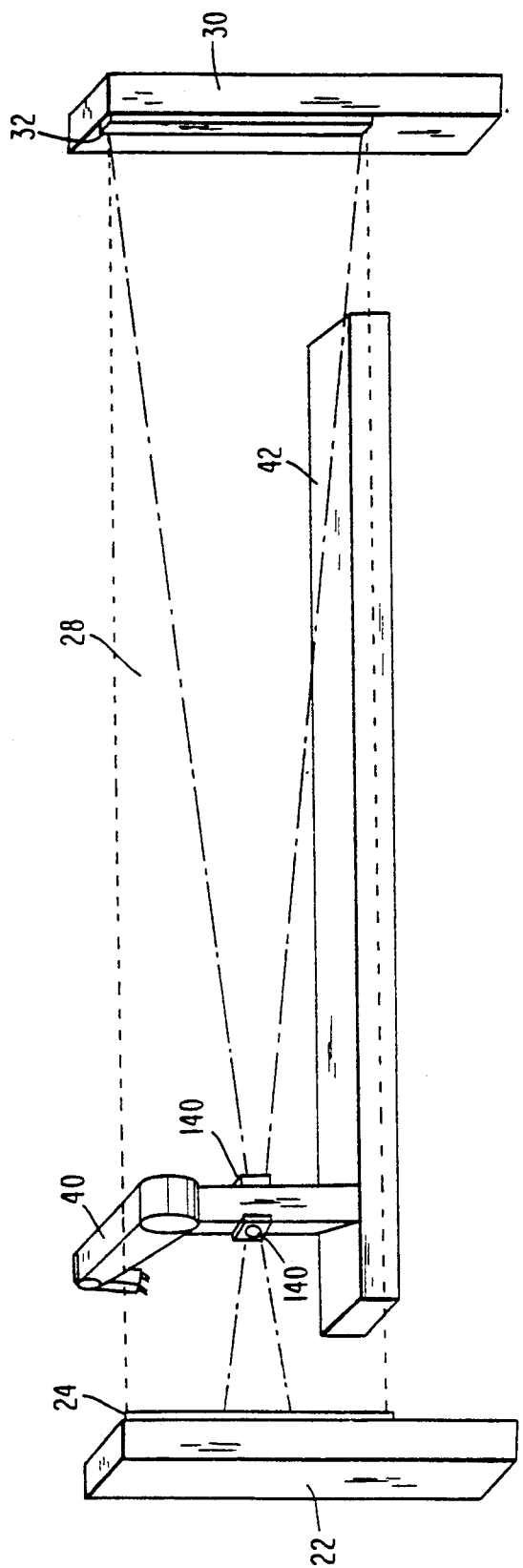
FIG. 9 depicts ranging signals emitted by ultrasonic transducers according to the embodiment shown in FIG. 7.

Another embodiment of the invention is shown in FIG. 9 wherein ultrasonic transducers 140 are mounted on opposite sides of linear travel-type robot 40 to directly measure a distance between the robot and an obstruction on either side of the robot. The known position of the robot is used to calculate the unobstructed distance from the robot to transmitter unit 22 and to receiver unit 30. If a lesser distance is detected by either transducer 140, the distance is interpreted as a distance to a foreign object. The system is otherwise similar to the first embodiment of the invention. Ultrasonic transducers 140 can also provide robot position information by detecting a distance to infrared transmitter 22 and infrared receiver 30. An abrupt change in the distance detected by either transducer is interpreted as a foreign object and information from the other transducer is used to determine robot position.

According to the invention, ultrasonic sensors are used in combination with a light curtain to reduce or eliminate unnecessary alarms or system shutdowns when separation between a protected device, such as a robot, and an obstruction is greater than a minimum safe operating distance. The system also provides a staged interlock by reducing a maneuvering speed of a robotic apparatus when an obstruction is detected within a warning range of distance from the apparatus to reduce an operating speed of the apparatus and prepare for a complete halt of the apparatus should there be a further decrease in distance between the obstruction and the apparatus. In all situations, the invention provides a fail-safe interlock system to completely inhibit robotic operation if valid range information is not available.

Although the present invention has been described and illustrated in detail, it is clearly understood that the same is by way of illustration and example only, it is not to be taken by way of limitation, the spirit and scope of the present invention being limited only by the terms of the appended claims. For example, although movement of a robot may be slowed or halted as the distance between the robot and an obstruction decreases, the direction of movement of the robot may be reversed to increase a separation distance. Further, certain motions or movements of the robot may be selectively inhibited in response to the detection system. Still further, although the invention has been described in terms of a robotic apparatus, it is equally applicable to protect personnel from other types of hazardous machinery wherein operations of the machine may be progressively inhibited or a staged alert provided in response to decreased separation between the machine and a foreign object or personnel.

I claim:

1. A safety interlock system for detecting a foreign object within a work space, comprising:
   light curtain means for detecting penetration of said foreign object through a planar area defining one side of said work space and, in response, supplying a penetration detection signal;
   ultrasonic sensor means for detecting a distance between said foreign object and a device located in said work space and, in response, supplying a distance signal; and
   control means for supplying a motion control signal to said device for selectively inhibiting movement thereof in response to said penetration detection and distance signals.

2. The safety interlock system according to claim 1 wherein said light curtain means includes:
   a plurality of light emitters spaced along one boundary of said planar area for transmitting parallel beams of light along said planar area;
   a plurality of detectors spaced along an opposite boundary of said planar area for detecting respective ones of said parallel beams of light; and
   detector means for detecting an interruption of said parallel beams of light.

3. The safety interlock system according to claim 1 wherein said ultrasonic sensor means includes:
   ultrasonic transmitter means responsive to a drive signal for transmitting ultrasonic energy in a direction substantially parallel to said planar area;
   ultrasonic receiver means for receiving a reflected ultrasonic signal to supply an echo signal; and
   ranging means responsive a time between said drive and echo signals for supplying said distance signal.

4. The safety interlock system according to claim 1 wherein said ultrasonic sensor means includes:
   a plurality of ultrasonic transducers vertically spaced at one end of said planar area for transmitting and receiving an ultrasonic signal in a substantially horizontal direction along said planar area; and
   ranging means responsive to a time interval between transmission of said ultrasonic signal and receipt of a reflected ultrasonic signal for supplying said distance signal.

5. The safety interlock system according to claim 1 wherein said device is responsive to said motion control signal to selectively (i) operate normally, (ii) operate with a reduced operating speed, or (iii) halt movement, and wherein said control means includes:
   target detection means responsive to said distance signal for supplying a target detect signal in response to said ultrasonic detector means detecting said foreign object;
   comparator means responsive to said distance signal for determining that said distance between said foreign object and said device is greater than, less than, or within a predetermined warning range of distances and, in response, supplying a trinary state range signal; and logic means responsive to said target detect signal, said range signal and said penetration detection signal for supplying said motion control signal.

6. The safety interlock system according to claim 5 wherein said logic means selectively supplies said motion control signal such that:
(i) said operating speed of said device is reduced when said foreign object penetrates said light curtain and is detected within said predetermined range of distances from said protected object; and
(ii) movement of said device is halted when said foreign object penetrates said light curtain and said foreign object is not detected by said target detection means or said distance between said foreign object and said device is detected to be less than said predetermined range of distances.

7. The safety interlock system according to claim 1 further comprising:
robotic controller means responsive to a stored program for supplying a robotic maneuvering control signal for maneuvering said device;
robotic speed control means responsive to said motion control signal and to said robotic maneuvering control signal for controlling a maneuvering speed of said device; and
robotic brake means responsive to said motion control signal for halting movement of said device.

8. A robotic control system for providing a motion control signal to a robotic apparatus maneuverable within a work space, comprising:
first sensor means for detecting penetration of a foreign object through a planar area defining one side of said work space and, in response, supplying a penetration detection signal;
second sensor means for detecting a distance between said foreign object and said robotic apparatus and, in response, supplying a distance signal;
control means for supplying a motion inhibit signal in response to said penetration detection and distance signals;
memory means for storing a set of instructions; and
processor means responsive to said set of instructions and to said motion inhibit signal for supplying said motion control signal to said robotic apparatus whereby a maneuvering speed of said robotic apparatus is selectively reduced in response to detection of said foreign object within said work space posing a collision hazard to said robotic apparatus.

9. The robotic control system according to claim 8 wherein said first sensor means comprises a light curtain including:
a plurality of light emitters spaced along one edge of said planar area for transmitting parallel beams of light along said planar area;
a plurality of detectors spaced along an opposite edge of said planar area for detecting respective ones of said parallel beams of light; and
logic means for detecting an interruption of said parallel beams of light and, in response, supplying said penetration detection signal.

10. The robotic control system according to claim 8 wherein said second sensor means comprises ultrasonic sensor means including:

ultrasonic transmitter means responsive to a drive signal for transmitting ultrasonic energy in a direction parallel to said planar area;
ultrasonic receiver means for receiving a reflected ultrasonic signal to supply an echo signal; and
ranging means responsive a time between said drive signal and said echo signal for supplying said distance signal.

11. The robotic control system according to claim 8 wherein said second sensor means includes:
a plurality of ultrasonic transducers vertically spaced at one end of said planar area for transmitting and receiving an ultrasonic signal in a substantially horizontal direction along said planar area; and
ranging means responsive to a time between transmission of an ultrasonic signal and receipt of a reflected ultrasonic signal for supplying said distance signal.

12. The robotic control system according to claim 8 wherein said robotic apparatus is responsive to said motion control signal to selectively (i) operate at a nominal maneuvering speed, (ii) operate at a reduced maneuvering speed less than said nominal maneuvering speed, or (iii) halt movement, and wherein said control means includes:
target detection means responsive to said distance signal for supplying a target detect signal in response to said ultrasonic detector means detecting said foreign object;
comparator means responsive to said distance signal for determining that said distance between said foreign object and said robotic apparatus is greater than, less than, or within a predetermined range of distances and, in response, supplying a trinary state range signal; and
logic means responsive to said target detect signal, said range signal and said penetration detection signal for supplying said motion inhibit signal.

13. The robotic control system according to claim 12 wherein said logic means selectively supplies said motion inhibit signal such that:
(i) said maneuvering speed of said robotic apparatus is reduced when said foreign object penetrates said planar area and is detected within said predetermined range of distances from said robotic apparatus; and
(ii) movement of said robotic apparatus is halted when said foreign object penetrates said planar area and (i) the foreign object is not detected by said target detection means or (ii) said distance between said foreign object and said robotic apparatus is less than said predetermined range of distances.

14. A method of inhibiting operation of a machine upon intrusion of a foreign object within a safety region, comprising the steps of:
(i) transmitting a detection signal along one boundary of said safety region to define a planar detection area;
(ii) detecting an interruption of said detection signal caused by a penetration of said planar detection area by the foreign object;
(iii) transmitting a ranging signal along said planar detection area;
(iv) receiving said ranging signal as reflected by said foreign object;
(v) calculating a distance between said foreign object and said machine; and (vi) controlling an operating speed of said machine in response to steps (ii) and (v).

15. The method according to claim 14 wherein:

said step of transmitting a detection signal includes the step of emitting, from one boundary of said planar detection area, a plurality of parallel light beams along one side of said safety region to an opposite boundary of said planar detection area; and said step of detecting an interruption of said detection signal includes the step of detecting an intensity of said light beams at said opposite boundary of said planar detection area.

16. The method according to claim 14 wherein:

said step of transmitting a ranging signal includes the step of emitting an ultrasonic signal;

said step of receiving said ranging signal includes a step of receiving an ultrasonic echo signal; and said calculating step includes a step of measuring a time between said emission of said ultrasonic signal and receipt of said ultrasonic echo signal.

17. The method according to claim 14 wherein said controlling step includes the steps of selectively:

(i) operating said machine at a nominal maneuvering speed with (a) no foreign object detected penetrating said planar detection area or (b) said distance to said foreign object calculated to be greater than a predetermined range of distances;

(ii) operating said machine at a reduced maneuvering speed with said distance to said foreign object calculated to be within said predetermined range of distances; and (iii) halting maneuvering of said machine with said foreign object detected penetrating said planar detection area and a distance to said foreign object (a) calculated to be less than said predetermined range of distances or (b) determined to be an invalid value.

18. The method according to claim 14 wherein said controlling step includes the steps of selectively:

(i) verifying reception of a valid ranging signal by said receiving step;

(ii) determining that said distance between said foreign object and said moveable object is greater than, less than, or within a predetermined warning range of distances; and (iii) controlling an operating speed of said machine in response to said detecting, verifying and determining steps.

19. A method of maneuvering a robotic apparatus within a work space comprising the steps of:

(i) detecting penetration of a foreign object through a planar area defining one side of said work space;

(ii) calculating a distance between said foreign object and said robotic apparatus; and (iii) maneuvering said robotic apparatus within said work space responsive to said detecting steps such that a maneuvering speed of said robotic apparatus is selectively reduced in response to detection of said foreign object within said work space posing a collision hazard to said robotic apparatus.

20. The method according to claim 19 wherein said detecting step comprises the steps of:

transmitting parallel beams of light along said planar area;

detecting respective ones of said parallel beams of light; and detecting an interruption of said parallel beams of light.

21. The method according to claims 19 wherein said calculating step comprises the steps of:

transmitting an ultrasonic signal in a direction parallel to said planar area;

receiving a reflected ultrasonic signal from said foreign object; and measuring a time between said transmission of ultrasonic signal and said reception of said reflected ultrasonic signal.

22. The method according to claim 19 wherein said maneuvering step comprises the steps of:

reducing a maneuvering speed of said robotic apparatus when said foreign object is detected penetrating said planar area and is detected within said predetermined range of distances; and halting movement of said robotic apparatus when said foreign object is detected penetrating said planar area and (i) the foreign object is detected by said calculating step not to be within a range of valid distances or (ii) said distance between said foreign object and said robotic apparatus is calculated to be less than said predetermined range of distances.

* * * * *